(12) United States Patent
Carmon et al.

(10) Patent No.: US 9,618,774 B2
(45) Date of Patent: Apr. 11, 2017

(54) QUASI PROGRESSIVE LENSES FOR EYEWEAR

(71) Applicant: Shamir Optical Industry Ltd., Kibbutz Shamir (IL)

(72) Inventors: Yuval Carmon, Kiryat Tivon (IL); Yotam Gil, Kiryat Tivon (IL); Liron Gleser, Rosh Pinna (IL); Alex Shur, Haifa (IL)

(73) Assignee: Shamir Optical Industry Ltd., Kibbutz Shamir (IL)

( * ) Notice: Subject to any disclaimer, the term of this patent is extended or adjusted under 35 U.S.C. 154(b) by 0 days.

(21) Appl. No.: 14/274,637

(22) Filed: May 9, 2014

(65) Prior Publication Data

US 2015/0226983 A1 Aug. 13, 2015

Related U.S. Application Data

(60) Provisional application No. 61/938,029, filed on Feb. 10, 2014, provisional application No. 61/971,469, filed on Mar. 27, 2014.

(51) Int. Cl.
*G02C 7/06* (2006.01)

(52) U.S. Cl.
CPC ............ *G02C 7/063* (2013.01); *G02C 7/065* (2013.01); *G02C 7/066* (2013.01)

(58) Field of Classification Search
CPC ........................................... G02C 7/06–7/068
USPC ....................................... 351/159.41–159.43
See application file for complete search history.

(56) References Cited

U.S. PATENT DOCUMENTS

| | | | |
|---|---|---|---|
| 1,406,782 | A | 2/1922 | Tillyer |
| 1,448,052 | A | 3/1923 | Brilhart |
| 1,518,405 | A | 12/1924 | Estelle |
| 1,588,559 | A | 6/1926 | Tillyer |
| 1,731,419 | A | 10/1929 | Hill et al. |
| 2,109,474 | A | 3/1938 | Evans |
| 2,878,721 | A | 3/1959 | Kanolt |
| 3,434,781 | A | 3/1969 | Davis et al. |
| 3,563,057 | A | 2/1971 | Rosenbauer |

(Continued)

FOREIGN PATENT DOCUMENTS

| | | |
|---|---|---|
| CN | 101952767 | 1/2011 |
| EP | 0027339 | 4/1981 |

(Continued)

OTHER PUBLICATIONS

International Search Report and Written Opinion dated May 22, 2015 in PCT/US2015/015224.

(Continued)

*Primary Examiner* — Zachary Wilkes
(74) *Attorney, Agent, or Firm* — Knobbe Martens Olson & Bear LLP

(57) ABSTRACT

Various embodiments disclose a quasi progressive lens including a first optical zone capable of providing distance vision, a second optical zone capable of providing near vision and a transition zone connecting the first and second optical zones. Physical dimensions (e.g., length and width) of the transition zone are adjusted to increase the size of the second optical zone in comparison to progressive lenses and to reduce residual cylinder power and aberrations along the convergence path in comparison to bifocal lenses.

20 Claims, 8 Drawing Sheets

(56) References Cited

U.S. PATENT DOCUMENTS

| | | |
|---|---|---|
| 3,687,528 A | 8/1972 | Maitenaz |
| 3,711,191 A | 1/1973 | Tagnon |
| 3,722,986 A | 3/1973 | Tagnon |
| 3,797,922 A | 3/1974 | Plummer |
| 4,461,550 A | 7/1984 | Legendre |
| 4,484,804 A | 11/1984 | Mignen |
| 4,514,061 A | 4/1985 | Winthrop |
| 4,592,630 A | 6/1986 | Okazaki |
| 4,606,622 A | 8/1986 | Fueter et al. |
| 4,613,217 A | 9/1986 | Fuerter et al. |
| 4,806,010 A | 2/1989 | Ewer et al. |
| 4,869,588 A | 9/1989 | Walach |
| 4,950,057 A | 8/1990 | Shirayanagi |
| 4,952,048 A | 8/1990 | Frieder |
| 4,989,316 A | 2/1991 | Logan et al. |
| 5,053,971 A | 10/1991 | Wood et al. |
| 5,137,343 A | 8/1992 | Kelch et al. |
| 5,210,695 A | 5/1993 | Wood |
| 5,305,028 A | 4/1994 | Okano |
| 5,444,503 A | 8/1995 | Kelch et al. |
| 5,485,771 A | 1/1996 | Brennan et al. |
| 5,583,589 A | 12/1996 | Phillips |
| 5,724,120 A | 3/1998 | Svochak et al. |
| 5,953,099 A | 9/1999 | Walach |
| 6,019,470 A | 2/2000 | Mukaiyama et al. |
| 6,089,713 A | 7/2000 | Hof et al. |
| 6,523,443 B1 | 2/2003 | Hof et al. |
| 6,655,803 B1 | 12/2003 | Rubinstein et al. |
| 6,709,106 B2 | 3/2004 | Kelch et al. |
| 6,786,600 B2 | 9/2004 | Katzman et al. |
| 6,824,268 B2 | 11/2004 | Rubinstein et al. |
| 6,955,433 B1 * | 10/2005 | Wooley .............. G02C 7/024 351/159.74 |
| 7,229,173 B2 | 6/2007 | Menezes |
| 7,296,357 B2 | 11/2007 | Katzman |
| 7,322,696 B2 | 1/2008 | Ben-Zeev et al. |
| 7,828,433 B2 | 11/2010 | Katzman et al. |
| 8,002,404 B2 | 8/2011 | Weatherby |
| 8,272,734 B2 | 9/2012 | Torrey |
| 8,449,111 B2 | 5/2013 | Weatherby |
| 8,752,959 B2 | 6/2014 | Carmon et al. |
| 8,931,898 B2 † | 1/2015 | Walach |
| 2005/0068490 A1 | 3/2005 | Mandell et al. |
| 2005/0099595 A1 | 5/2005 | Lindacher |
| 2006/0050236 A1 | 3/2006 | Menezes |
| 2008/0002148 A1 | 1/2008 | Menezes |
| 2012/0038882 A1 | 2/2012 | Blum et al. |
| 2013/0114040 A1 | 5/2013 | Dursteler Lopez et al. |
| 2013/0188143 A1 | 7/2013 | Carmon et al. |
| 2014/0240470 A1 | 8/2014 | Dias Da Silva et al. |
| 2014/0319748 A1 | 10/2014 | Hainebach et al. |
| 2014/0362340 A1 | 12/2014 | Walach |
| 2015/0077704 A1 | 3/2015 | Carmon et al. |
| 2015/0253587 A1 * | 9/2015 | Carmon ............... G02C 7/066 351/159.42 |

FOREIGN PATENT DOCUMENTS

| | | |
|---|---|---|
| EP | 0560999 | 9/1993 |
| EP | 0809126 | 3/2003 |
| GB | 1239620 | 7/1971 |
| PL | P.404250 | † 12/2014 |
| WO | WO 82/03129 | 9/1982 |
| WO | WO 97/13603 | 4/1997 |
| WO | WO 2008-121975 | 10/2008 |
| WO | WO 2012-007946 | 1/2012 |
| WO | WO 2012-046230 | 4/2012 |
| WO | WO 2013-128439 | 9/2013 |
| WO | WO 2014-030154 | 2/2014 |
| WO | WO 2014-197466 | 12/2014 |
| WO | WO 2015-120456 | 8/2015 |

OTHER PUBLICATIONS

Office Action dated Apr. 3, 2014 in U.S. Appl. No. 14/178,992.
Office Action Response dated May 28, 2014 in U.S. Appl. No. 14/178,992.
Supplemental Response dated Jun. 26, 2014 in U.S. Appl. No. 14/178,992.
Final Office Action dated Aug. 19, 2014 in U.S. Appl. No. 14/178,992.
Office Action Response dated Oct. 9, 2014 in U.S. Appl. No. 14/178,992.
Notice of Allowance dated Oct. 23, 2014 in U.S. Appl. No. 14/178,992.
Petition to Withdrawal from Issue dated Nov. 12, 2014 in U.S. Appl. No. 14/178,992.
Notice of Allowance dated Dec. 10, 2014 in U.S. Appl. No. 14/178,992.
Issue Notification dated Dec. 23, 2014 in U.S. Appl. No. 14/178,992.
ISA/RU, Notification of Transmittal of the International Search Report and the Written Opinion of the International Searching Authority, or the Declaration, Oct. 9, 2014 in PCT/US2014/040689.
International Search Report dated Sep. 16, 2014 in PCT/US2014/040689.
Miscellaneous Communication from the International Bureau dated Sep. 14, 2015 in PCT/US2015/015224.
Third Party Observation communication date Sep. 10, 2015 in PCT/US2015/015224.
Carlton, J. "An Easy Way to Select the Right Pal," Eyecare Business, Issue, pp. 66-73, Nov. 1, 2013.
Meister, D. "Optics of Progressive Lenses," downloaded from http://www.opticampus.com/cecourse.php?url=progressive_lenses/, earliest available online on Mar. 23, 2006.
Gilbert, P., "Working with Variable Corridor Progressive Lenses," Optometry Today, vol. 53, Issue 19, p. 44, Oct. 4, 2013.
Meister, D. and Sheedy, J.E., "Introduction to Ophthalmic Optics," pp. 1-125, Jul. 1999.
American National Standard for Ophthalmics—"Prescription Spectacle Lenses," pp. 137, Apr. 28, 2010.
Application as filed on Jun. 7, 2013 in the Patent Office of the Republic of Poland as Application No. PL20130404250.
Electronic communication dated Sep. 10, 2015 from Alan Harrison, Attorney at Law, McCormick, Paulding & Huber LLP; prosecution attorney for U.S. Pat. No. 8,931,898.
Article 19 Amendments filed Dec. 9, 2014 in PCT/US2014/040689.

\* cited by examiner
† cited by third party

QUASI PROGRESSIVE LENSES FOR EYEWEAR

CROSS-REFERENCE TO RELATED APPLICATIONS

This application claims benefit under 35 U.S.C. §119(e) of U.S. Provisional Application No. 61/971,469, filed on Mar. 27, 2014, titled "Quasi Progressive." This application also claims benefit under 35 U.S.C. §119(e) of U.S. Provisional Application No. 61/938,029, filed on Feb. 10, 2014, titled "BIFOCAL LENS." The disclosure of each of the above identified applications is incorporated by reference herein in their entirety.

BACKGROUND OF THE INVENTION

Field of the Invention

This description relates generally to ophthalmic lenses used in eyewear that provide near vision as well as distance vision correction.

Description of the Related Art

Refractive errors are the most frequent eye problems encountered by patients of all ages. Refractive errors include (i) myopia or near-sightedness, a condition in which objects at a far distance (e.g., at a distance greater than 20 feet) appear blurred; (ii) hyperopia or farsightedness in which in which objects at a near distance (e.g., at a distance less than 2 feet) appear blurred; (iii) astigmatism in which objects at near distance, far distance as well as intermediate distance appear blurred; and (iv) presbyopia that includes loss of the ability of the eye to focus on near objects. These and other refractive errors can be corrected, for example, by ophthalmic lenses such as those used in eyeglasses.

Patients suffering from hyperopia that also suffer from presbyopia or may require a first pair of ophthalmic lenses that provide distance vision and a second pair of ophthalmic lenses that provide near vision. Bifocal lenses can correct both near and far vision with the same lens and eliminate the need for separate pairs of ophthalmic lenses for viewing objects at near and far distances. Presbyopic patients can also benefit from progressive lenses that can correct near, intermediate and far vision.

SUMMARY OF THE INVENTION

Bifocal lenses can correct both far and near vision with the same lens. Bifocal lenses include a first optical zone that provides correction for far or distance vision and a second optical zone that provide correction for near vision. The second zone is usually disposed more nasally in the lower portion of the lens. Bifocal lenses available in the market today have several disadvantages. For example, as the patient's gaze moves from far vision to near vision, a patient can experience loss of image and abrupt jump in the image. Moreover, the transition between the first and second optical zones of available bifocal lenses can have unwanted aberrations that can reduce visual quality and cause vision discomfort. In addition, in many available bifocal lenses, the first and second optical zones may be separated by a visible dividing line, which may be aesthetically unappealing. Furthermore, while bifocal lenses may be able to correct distant and near vision, they may be unable to provide good quality vision at intermediate distances. Progressive lenses can overcome some of the disadvantages of bifocal lenses. For example, many available progressive lenses include a corridor between the first optical zone that provides far or distance vision and the second optical zone that provides near vision. The optical power in the corridor can gradually increase as the gaze moves from far vision to near vision such that objects at intermediate distances between far and near distance can be viewed comfortably through the corridor. However, in some implementations of progressive lenses, the second optical zone providing near vision may occupy a smaller portion of the total area of the lens, which can result in degrading the visual experience associated with viewing objects located at near distances. In some implementations of progressive lenses, the corridor can be long and/or wide. In various embodiments, elongating the corridor may lead to reduce residual cylinder power or aberrations in the first optical zone, the second optical zone and/or in the peripheral zone, while widening the corridor can lead to a strengthening of residual cylinder power or aberrations in these areas. Additionally, in implementations of progressive lenses having long corridors, the patient may have to lower the gaze to such an extent that may be uncomfortable for use when transitioning from far vision state to near vision state and vice-versa.

Nevertheless, various lens embodiments described herein provide an ophthalmic solution that offers the user improved vision at near and far distances while increasing the portion of the total area occupied by the first and second optical zones providing far and near vision. Such lenses can also reduce visual distortions when the patient's gaze transitions from far vision to near vision in comparison to bifocals such as blended bifocals. The embodiments disclosed herein include a quasi progressive ophthalmic solution (such as, for example, lens blanks, eyeglass lenses, and glasses for eyewear) that include a short and a narrow transition zone between the first and second optical zones that provide near and distance vision. As a result of the reduction in the width and/or length of the transition zone, the percentage of the total area occupied by the first and the second optical zones providing far and particularly near vision can increase as compared to progressive lenses. Another consequence of reducing the width and/or length of the transition zone is a decrease in the residual cylinder power in the first and the second optical zones and/or the peripheral zones such that the visual quality at far and near distances is increased over the visual quality provided by available progressive lenses. Various embodiments described herein provide a lens having a residual cylinder power, power gradient and/or vertical prism gradient along the convergence path that is significantly lower than available bifocal lenses. Yet another advantage of reducing the length of the transition zone is that a patient can transition from far vision to near vision and vice versa with less movement of the gaze as compared to progressive lenses. In various implementations of the quasi progressive ophthalmic solution, the transition zone can have large optical power gradient such that objects at intermediate distances cannot be viewed or gazed comfortably through the transition zone. In various implementations of the quasi progressive ophthalmic solution, the transition zone can be optically non-functional such that objects at intermediate distances appear blurred, distorted and/or unclear. In some instances, objects at intermediate distances cannot be resolved when viewed through the optically non-functional transition zone.

One innovative aspect of the subject matter described in this disclosure can be implemented in an ophthalmic lens comprising a far optical zone capable of providing far vision, a near optical zone capable of providing near vision and a corridor connecting the far optical zone and the near optical zone. The near optical zone has a width between about 12 mm and about 40 mm.

Another innovative aspect of the subject matter described in this disclosure can be implemented in an ophthalmic lens comprising a far optical zone capable of providing far vision, a near optical zone capable of providing near vision and a corridor connecting the far optical zone and the near optical zone. The corridor can have a length between about 3 mm and about 8 mm.

Yet another innovative aspect of the subject matter described in this disclosure can be implemented in an ophthalmic lens comprising a far optical zone capable of providing far vision, a near optical zone capable of providing near vision and a transition zone connecting the far optical zone and the near optical zone. The transition zone has a power gradient extending from the far optical zone to the near optical zone with lower power closer to the far optical zone and higher power closer to the near optical zone. The power gradient can have a value between about 0.05 D/mm and about 1.25 D/mm.

An innovative aspect of the subject matter described in this disclosure can be implemented in an ophthalmic lens comprising a far optical zone capable of providing far vision, a near optical zone capable of providing near vision, said near optical zone for providing addition and a transition zone connecting the far optical zone and the near optical zone. The near optical zone has (i) a near reference point (NRP) or (ii) a centroid of the area in the near optical zone in which the addition is not less than the maximum addition minus 0.25. The near optical zone has a horizontal width as measured through (i) the near reference point or (ii) said centroid, said horizontal width extending across the near optical zone over a distance where the addition is not less than the maximum addition value minus 0.25 D. The horizontal width is between about 12 mm and about 40 mm.

One innovative aspect of the subject matter described in this disclosure can be implemented in an ophthalmic lens comprising a far optical zone capable of providing far vision, a near optical zone capable of providing near vision, said near optical zone for providing an addition between 1.75 D and 4 D and a transition zone connecting the far optical zone and the near optical zone. The far optical zone has a fitting point (FP) and a horizontal width as measured through the fitting point across the far optical zone over a distance where residual cylinder is not more than 0.5 D. The horizontal width can be between about 30 mm and about 70 mm.

Another innovative aspect of the subject matter described in this disclosure can be implemented in an ophthalmic lens comprising a far optical zone capable of providing far vision, a near optical zone capable of providing near vision and a transition zone connecting the far optical zone and the near optical zone. The far optical zone has a horizontal width as measured across the widest portion of the far optical zone that is between about 30 mm and about 70 mm.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts.

DETAILED DESCRIPTION OF THE PREFERRED EMBODIMENT

Figure 1:
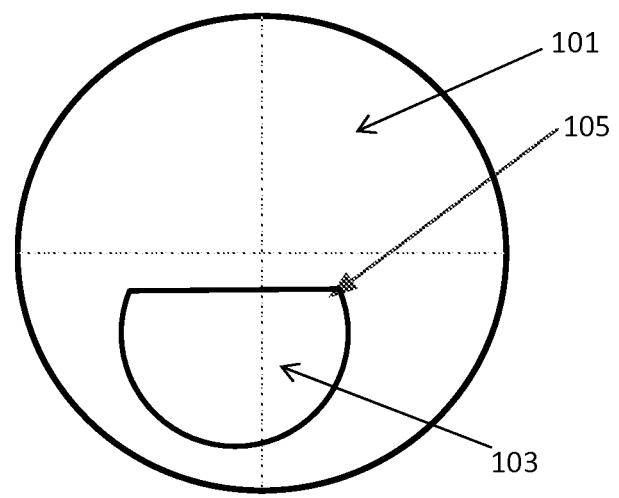
FIG. 1 shows a schematic representation of an embodiment of a flat-top bifocal lens.

It is to be understood that the figures and descriptions of the present invention have been simplified to illustrate elements that are relevant for a clear understanding of the present invention, while eliminating, for the purpose of clarity, many other elements found in typical lenses, lens design and/or manufacturing methods, and eyewear. Those of ordinary skill in the arts can recognize that other elements and/or steps are desirable and may be used in implementing the embodiments described herein.

As used herein, the term "fitting point" may indicate a point on a lens as mounted in a spectacle frame, aligned with the patient's center of the pupil in its distance viewing position when the patient is looking straight ahead.

The term "clean" used in reference with an optical zone or area including a powered surface indicates that optical zone or area has residual cylinder power or aberrations below a threshold (e.g., less than 1.0 Diopter, less than 0.75 Diopter, less than 0.5 Diopter, less than about 0.25 Diopter, less than about 0.12 Diopter, less than about 0.06 Diopter, less than about 0.03 Diopter, etc.).

The term "visual distortion" as used herein is a result of unwanted or residual cylinder and as such is quantified using residual cylinder power.

The term "residual cylinder power" or "residual cylinder" is used herein consistently as understood by those skilled in the art to indicate the cylinder power obtained by subtracting any prescribed cylinder power from the total cylinder power. Such calculations are known by one skilled in the art.

The term "far vision" or "distance vision" as used herein indicates the refraction correction the eye of a patient requires from a vision correcting lens when viewing objects at a distance greater than about 20 feet while the patient uses no accommodation. The term "near vision" as used herein indicates the refraction correction the eye of a patient requires from a vision correction lens when viewing objects at a distance of about 16 inches, taking into account the patient's accommodation ability. The term "far optical zone"

or "far zone" as used herein refers to the optical zone or area that is configured to provide distance vision. The term "near optical zone" or "near zone" as used herein refers to the optical zone or area that is configured to provide near vision.

The term "near reference point" is used herein consistently as set forth in ANSI 3.21.3 standard and indicates the point on a lens as specified by the manufacturer at which the addition of power is measured.

As used herein, the terms "slope" and "gradient" can be used interchangeably. As used herein optical power is measured in Diopter and can be expressed with units of "Diopter" or "D". As used herein the terms "add power" "addition" and "addition power" can be used interchangeably. As used herein the terms "corridor" and "transition zone" can be used interchangeably. As used herein the terms "segment" and "zone" can be used interchangeably.

Various bifocal lenses available in the market today include (a) flat-top bifocal lens and (b) blended bifocal lens. FIG. 1 shows a schematic representation of an embodiment of a flat-top bifocal lens. The illustrated embodiment of a flat-top bifocal lens includes a first optical zone 101 that is capable of providing distance or far vision and a second optical zone 103 that is capable of providing near vision. The first optical zone 101 has optical properties such that it is capable of providing distance vision (e.g., at far distances greater than 20 feet). The second optical zone 103 has optical properties such that it is capable of providing near vision (e.g., at near distances of about 16 inches). A visible dividing line 105 separates the first optical zone 101 and the second optical zone 103. In various implementations, the first and second optical zones 101 and 103 can be offset with respect to each other along a z-axis (shown), such that the first and second optical zones 101 and 103 are physically discontinuous. Likewise, the surface of the lens is not smooth at this location and instead has an abrupt discontinuity in the surface gradient. Without any loss of generality, in various cases the power of the first optical zone 101 can be smaller than the power of the second optical zone 103 such that the second optical zone 103 has more addition power than the first optical zone 101.

As the patient's gaze moves from viewing objects at far distances to viewing objects at near distances, the patient's pupil traces a path referred to as the "natural convergence path" or "convergence path." This path can refer to the vertical and horizontal gaze angle a patient uses to view objects that are straight ahead and at varying distances. Without any loss of generality, the projection of the convergence path on the surface of the lens is oblique and extends along a line that is coincident with the axis of symmetry of the first optical zone to a more nasal location disposed in the lower portion of the lens. Accordingly, the second optical zone 103 is disposed more nasally (or towards a patient's nose) in the lower portion of the lens.

Embodiments of flat-top bifocal lenses can have several disadvantages. For example, the optical power can abruptly change as the patient's gaze moves from viewing objects located at far distances through the first optical zone 101 to viewing objects located at near distances through the second optical zone 103. This abrupt change in optical power can result in discontinuity of accommodation of the patient's eye, temporary loss of image at intermediate distances between near and far distances and/or a shift in the image or image jump. These effects can degrade the viewing experience. Moreover, only certain lens materials can be used for flat-top bifocal lenses. In addition, due to the discontinuity of the lens surface at the transition between the two zones, a high level of effective residual cylinder power or aberrations can be encountered as the eye transverses across this transition when following the convergence path. Additionally, due to the discontinuous nature of their surface, flat-top bifocal lens cannot be manufactured using conventional Freefrom techniques and machines available today in many processing labs. It therefore follows that flat top bifocals cannot be manufactured in a conventional processing lab using conventional spherical semi-finished blanks. Instead, semi-finished blanks already incorporating the discontinuous properties of the lens surface have to be manufactured for different materials. These semi-finished blanks may be specific for manufacturing flat bifocal lenses, and as such can be less versatile than spherical semi-finished blanks that are widely available in the market from which many continuous lens designs can be manufactured using freeform technology. Accordingly, a patient may have limited selection of materials and treatment options when ordering flat-top bifocal lenses. Furthermore, the optometrist or the lab that manufactures flat-top bifocal lenses may need to keep a full inventory of specialized semi-finished optical lens blanks for each treatment (e.g. polarized, photochromic, and NXT lenses) option.

Figure 2:
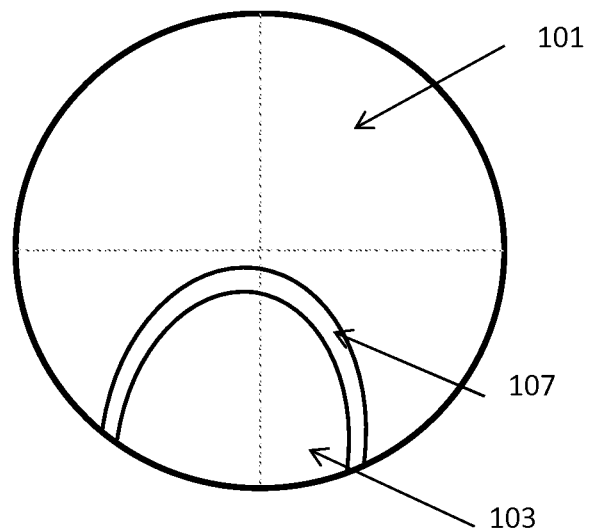
FIG. 2 shows a schematic representation of an embodiment of a blended bifocal lens.

FIG. 2 shows a schematic representation of an embodiment of a blended bifocal lens. In the illustrated embodiment of a blended bifocal lens, the first optical zone 101 and the second optical zone 103 are separated by a blended zone 107. The blended zone 107 is border that surrounds the second optical zone 103. In the illustrated implementation, the second optical zone 103 has a central width of about 24 mm, and the blended zone 107 has a uniform thickness of about 3 mm. The blended zone 107 can have an optical power gradient such that there is a smooth transition of optical power from the first optical zone 101 to the second optical zone 103. Accordingly, the presence of the blended zone 107 can also eliminate a physically discontinuity between first and second optical zones 101 and 103 such that the separation between the first and second optical zones 101 and 103 is not visible. Additionally, the abrupt discontinuity in optical power between the first optical zone 101 and the second optical zone 103 can be avoided. While, the blended bifocal lenses may be more aesthetically appealing over flat-top bifocal lenses, visual distortion, temporary loss of image and/or an image jump can occur in the blended zone 107 as the patient's gaze shifts from the first optical zone 101 to the second optical zone 103. In addition, the power gradients and/or the residual cylinder power in the blended zone 107 can be high due to the narrow width of the blended zone 107. The patient's eye, as it traverses the convergence path in moving from the first optical zone 101 (distance vision zone) to the second optical zone 103 (near vision zone) will traverse through the blended zone 107. The high power gradients and/or the residual cylinder power in the blended zone 107 can cause vision discomfort.

Figure 3A:
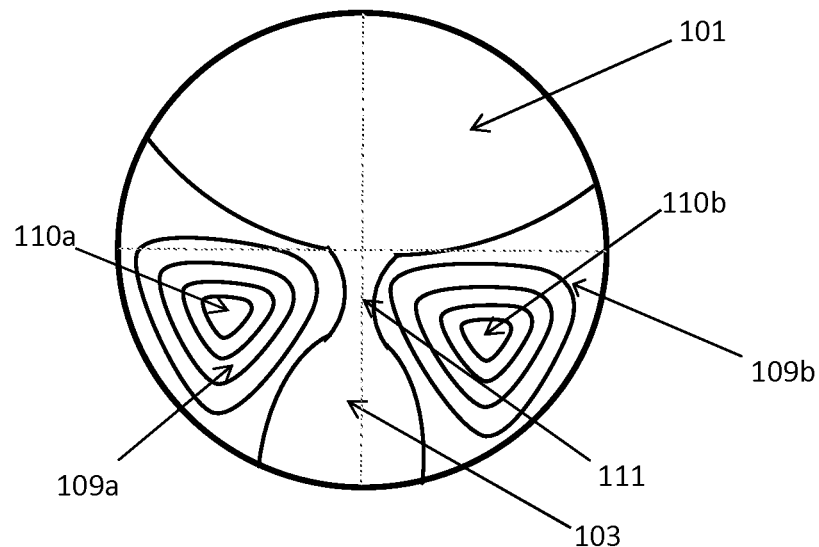
FIG. 3(a) is a schematic illustration of an embodiment of a progressive lens further illustrating the residual cylinder power or aberrations in the peripheral zones of the lens.

Progressive lenses available in the market today can overcome some of the disadvantages of bifocal lenses. FIG. 3(a) is a schematic illustration of an embodiment of a progressive lens further illustrating the residual cylinder power or aberrations in the peripheral zones of the lens. A progressive lens includes a first optical zone 101 capable of providing far vision; a second optical zone 103 capable of providing near vision; a corridor (or a transition zone) 111 connecting the first and the second optical zones 101 and 103 and one or more peripheral zones 109a and 109b disposed about the corridor 111. The corridor 111 is a region on the surface of the lens between the first optical zone 101 and the second optical zone 103 where the optical addition power gradually increases (e.g., monotonically increases or linearly increases) as the patient's gaze moves from far vision to near vision along the natural convergence path while the maximum residual cylinder power and/or aberrations is below a threshold. The threshold can be about 0.5 Diopter, about 0.25 Diopter or about 0.12 Diopter. The optical addition power gradient and size of the corridor 111 is configured such that objects at intermediate distance (for example between about 2 feet and about 6 feet) can be viewed comfortably through the corridor 111. The length and/or width of the corridor 111 for a progressive lens can be adjusted such that peripheral zones 109 have residual cylinder powers and/or aberrations below a threshold.

In various implementations of available progressive lenses, the separation between the first optical zone 101, the corridor 111 and the second optical zone 103 is not visible. Thus, such implementations of progressive lenses may be aesthetically pleasing. Furthermore, since the optical power transitions smoothly and continuously across the first optical zone 101, the corridor 111 and the second optical zone 103 along the convergence path of the patient's eye, visual distortion and other effects such as loss of image, image jump are eliminated or significantly reduced when a patient's gaze shifts from far vision to near vision. However, in most progressive lenses, the second optical zone 101 occupies a smaller portion of the surface area of the progressive lens as compared to the portion of the surface area of the progressive lens occupied by the first optical zone. In various implementations, the area of the second optical zone 103 can be significantly smaller than the area of the first optical zone 101. In addition, due to the long corridor between the first optical zone 101 and the second optical zone 103, a patient may have to lower his/her gaze considerably when transitioning from a distance vision state to a near vision state. This can cause discomfort to some patients.

The embodiment of the progressive lens illustrated in FIG. 3(a) includes two peripheral zone 109a and 109b disposed on either side of the corridor 111. The peripheral zone 109a is disposed nasally while the peripheral zone 109b is disposed temporally. FIG. 3(a) illustrates the residual cylinder power in the peripheral zones 109a and 109b as contours. The outermost contour indicates the boundary of the region having least residual cylinder power while the inner most contour indicates the boundary of the region having maximum residual cylinder power. In the embodiment illustrated in FIG. 3(a), region 110a has the maximum residual cylinder power in the nasal peripheral zone and region 110b has the maximum residual cylinder power in the temporal peripheral zone.

Figure 3B:
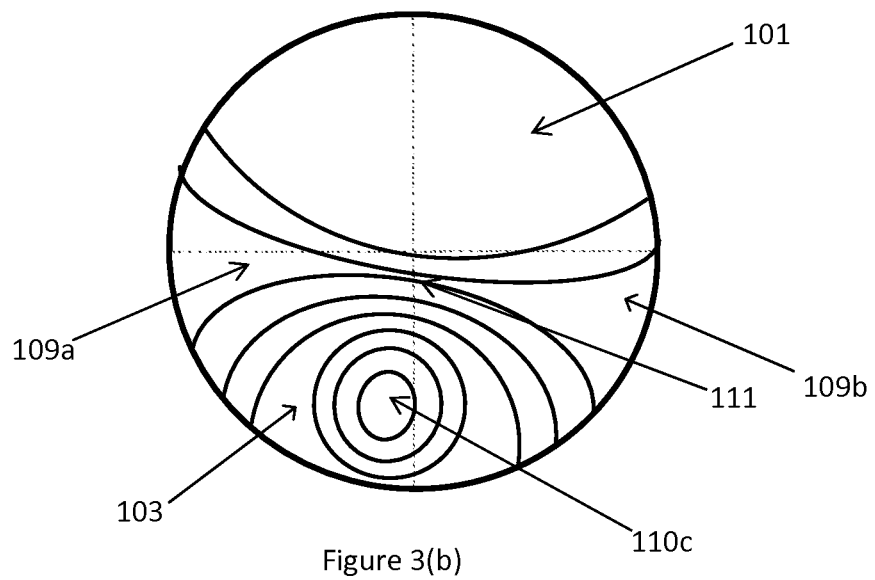
FIG. 3(b) illustrates a schematic contour plot of the addition power in the different portions of the embodiment of progressive lens shown in FIG. 3(a).

FIG. 3(b) illustrates the schematic contour plot of the addition power in the different portions of the embodiment of progressive lens shown in FIG. 3(a). Different contours indicate the boundaries of regions with different optical addition powers. The region 110c of the second optical zone corresponds to the region with maximum addition power. The optical addition power progressively decreases away from the region 110c towards the peripheral zones 109a and 109b. It is noted from FIG. 3(b) that the addition power in the corridor 111 increases gradually (e.g., monotonically or linearly) from the first optical zone 101 to the second optical zone, as discussed above.

Figure 4A:
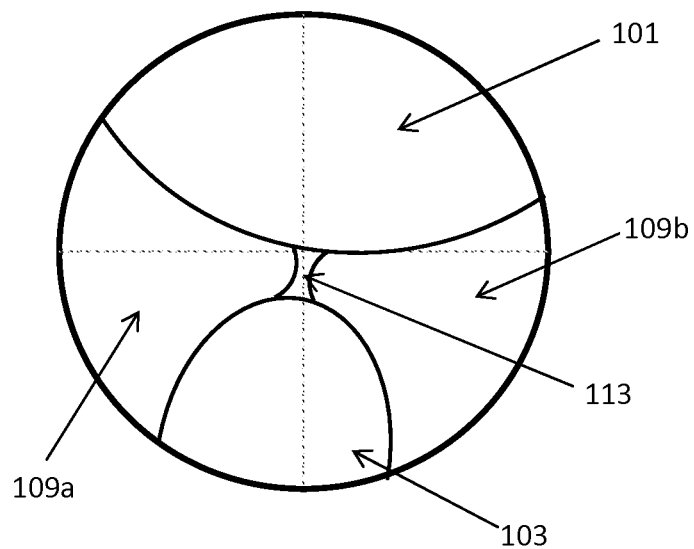
FIGS. 4(a) and 4(b) schematically illustrate different embodiments of quasi progressive lenses.
Figure 4B:
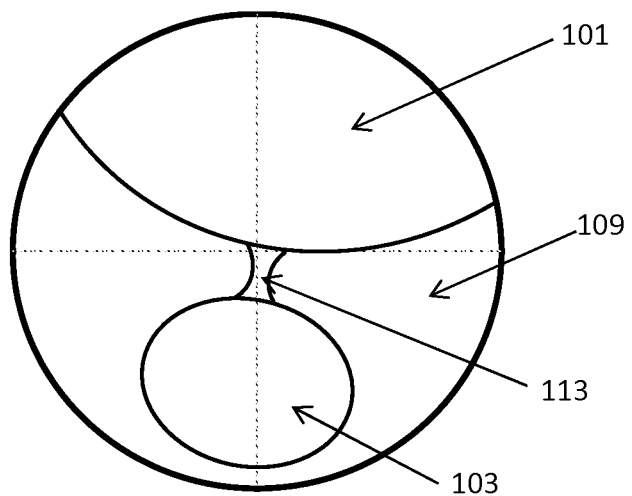

Various embodiments disclosed herein provide quasi progressive lenses that overcome some of the disadvantages of bifocal lenses and progressive lenses as discussed below. FIGS. 4(a) and 4(b) schematically illustrate different embodiments of a quasi progressive lens having a first optical zone 101 capable of providing distance vision (or alternately intermediate distance vision in some embodiments) connected to a second optical zone 103 capable of providing near vision (or alternately intermediate distance vision in some embodiments) by a transition zone 113. The first optical zone 101 can be referred to as the far vision zone when configured to provide distance vision. The second optical zone 103 can be referred to as the near vision zone when configured to provide near vision. As used herein, the transition zone 113 is a region on the surface of the quasi progressive lens between the first optical zone 101 and the second optical zone 103 where the optical addition power gradually increases (e.g., monotonically increases or linearly increases) as the patient's gaze moves from far vision to near vision along the natural convergence path while the maximum residual cylinder power and/or aberrations is below a threshold. The threshold can be about 0.5 Diopter, about 0.25 Diopter or about 0.12 Diopter.

The embodiment illustrated in FIG. 4(a) includes two distinct and separated peripheral zones 109a (disposed nasally) and 109b (disposed temporally). In the embodiment illustrated in FIG. 4(b) the second optical zone 103 is disposed with respect to the lower edge of the lens such that the two distinct peripheral zones 109a (disposed nasally) and 109b (disposed temporally) are connected along the lower edge of the lens to form a single peripheral zone 109. In various implementations, the first optical zone 101, the second optical zone 103, the transition zone 113 and the peripheral zones 109a and 109b are formed on the same surface (either front surface or back surface) of a lens. The first optical zone 101, the second optical zone 103, the transition zone 113 and the peripheral zones 109a and 109b are formed on the surface of the lens blank such that the surface of the lens blank appears smooth without any steps, indentations, or protrusions.

Figure 5:
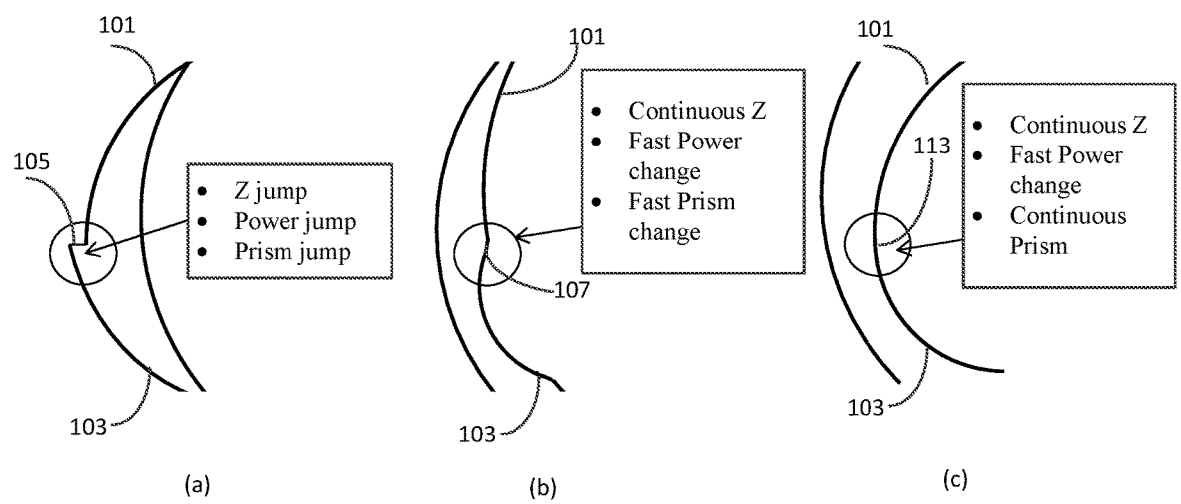
FIGS. 5(a), 5(b) and 5(c) schematically illustrate cross-sectional views of an embodiment of a flat-top bifocal lens, an embodiment of a blended bifocal lens, and an embodiment of a quasi progressive lens, respectively.

Embodiments of quasi progressive lenses have several advantages over bifocal lenses. For example, the transition zone 113 connecting the first and second optical zones 101 and 103 advantageously avoids geometric singularities such as a singular point or line between the first and second optical zones 101 and 103. The geometric differences between quasi progressive lens, flat-top bifocal lens and a blended bifocal lens are illustrated in FIGS. 5(a), 5(b) and 5(c) which schematically illustrate cross-sectional views of an embodiment of a flat-top bifocal lens, an embodiment of a blended bifocal lens and an embodiment of a quasi progressive lens, respectively. As illustrated in FIG. 5(a), the first and second optical zones 101 and 103 for the illustrated embodiment of a flat-top bifocal lens are separated by a visible step and edge 105 which represents a line of physical discontinuity in the surface and accompanying optical discontinuity.

As noted from FIG. 5(a), the surface of the lens including the slope of the surface of the lens (also referred to as prism) and the optical power, which is correlated to the second derivate of the surface of the lens, transition abruptly across the line 105. Additionally, the surface of the lens itself has a discontinuity due to the second optical zone 103 being physically offset from the first optical zone 101 by a distance measured in the z direction (see z-axis).

In contrast, as noted from FIG. 5(b), a blended bifocal lens does not exhibit a physical step discontinuity between the first and second optical zones 101 and 103. Instead a smooth transition is provided between the first and second optical zones 101 and 103. However, the optical power as well as the prism changes rapidly across the blended zone 107. This rapid change in the surface introduces high levels of residual cylinder power or aberrations which can lead to disadvantageous optical effects.

As noted from FIG. 5(c), the first and second optical zones 101 and 103 are not physically offset with respect to each other thus there is no physical discontinuity in the surface of the lens. In fact, the transition zone 113 connects the first and the second optical zone 101 and 103 continuously to form a smooth surface. Additionally, the slope of the surface of the lens (prism) also varies continuously across the transition zone 113. The transition zone 113 can also be devoid of discontinuity in the surface curvature. Additionally, the transition zone 113 can be devoid of discontinuity in the slope of the surface curvature. However, it is noted from FIG. 5(c) that the optical power, which is correlated with the second derivate of the surface of the lens, varies rapidly across the transition zone 113 between the first optical zone 101 and the second optical zone 103.

Accordingly, the quasi progressive lens may be aesthetically more pleasing. Additionally, the continuity of the slope of the surface of the lens across the transition zone 113 may be advantageous in avoiding loss of image and/or image jumps as the patient's gaze shifts from distance vision to near vision through the convergence path. In addition, as a direct consequence of the overall continuity of the lens, less unwanted residual cylinder power or aberrations are encountered along the convergence path in the quasi progressive relative to the flat top and blended bifocal designs. Accordingly, a patient when using quasi progressive lenses may be able to transition from distance vision to near vision and experience less distortion and have a more positive viewing experience as compared to when using conventional blended bifocal as well as flat-top bifocal lenses.

Figure 6:
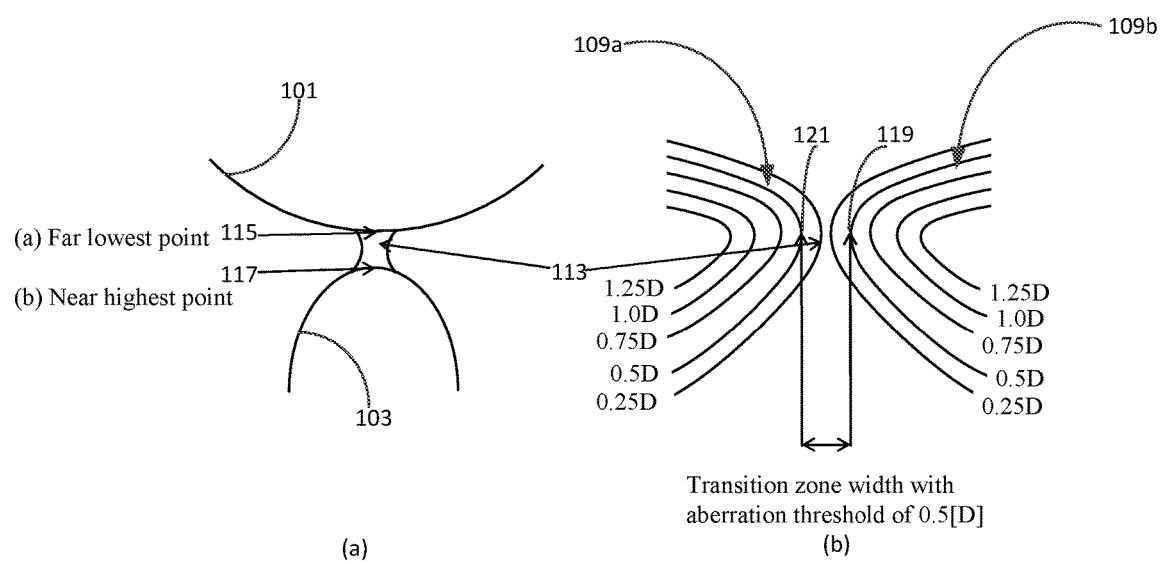
FIG. 6(a) schematically illustrates a technique of measuring the length of the transition zone included in a quasi progressive lens.
FIG. 6(b) schematically illustrates a technique of measuring the width of the transition zone included in a quasi progressive lens.

The length of the transition zone 113 can be obtained by analyzing measurements of the addition power in the first and second optical zones 101 and 103 and in the transition zone 113. For example, one technique of measuring the length of the transition zone 113 includes starting from the first optical zone 101 and obtaining a first point in, adjacent to, and/or proximal to the first optical zone 101 along the convergence path below the fitting point (FP) where the addition power has a lower threshold value and obtaining a second point in, adjacent to and/or proximal the second optical zone 103 where the addition power has an upper threshold value. The length of the transition zone 113 is the distance between the first and second points. FIG. 6(a) schematically illustrates this technique of measuring the length of the transition zone 113. In FIG. 6(a), the first point is indicated by the reference numeral 115 and second point by reference numeral 117. The length of the transition zone 113 for the embodiment illustrated in FIG. 6(a) is the distance between the first point 115 and the second point 117.

In various embodiments, the lower threshold value can correspond to the minimum addition power. In various embodiments, the lower threshold value can be between about 0 Diopter and about 0.25 Diopter (e.g., 0, 0.01 Diopter, 0.03 Diopter, 0.05 Diopter, 0.1 Diopter, or 0.125 Diopter). In various embodiments, the upper threshold value can correspond to the maximum addition power. In various embodiments, the upper threshold value can correspond to the maximum addition power minus a subtraction value. The subtraction value can be between about 0 Diopter and 0.25 Diopter (e.g., between about 0 Diopter and about 0.25 Diopter (e.g., 0, 0.01 Diopter, 0.03 Diopter, 0.05 Diopter, 0.1 Diopter, or 0.125 Diopter).

The width of the transition zone 113 can be obtained by measuring the residual cylinder power in the peripheral zones 109a and 109b. The width of the transition zone 113 is measured for a particular residual cylinder power or aberration threshold. In one technique of measuring the width of the transition zone 113, a left most point of the temporal peripheral zone 109b and a right most point of the nasal peripheral zone 109a where the maximum residual cylinder power is below a threshold cylinder power is determined. The width of the transition zone 113 for that threshold residual cylinder power is the distance between the left most and right most points. FIG. 6(b) schematically illustrates this technique of measuring the width of the transition zone 113. In FIG. 6(b), the left most point of the temporal peripheral zone 109b at which the maximum residual cylinder power is below 0.5 Diopter is indicated by the reference numeral 119 and right most point of the nasal peripheral zone 109a at which the maximum residual cylinder power is below 0.5 Diopter is indicated by the reference numeral 121. The width of the transition zone 113 for the embodiment illustrated in FIG. 6(b) is the distance between the point 119 and the point 121. In various embodiments of the quasi progressive lenses described herein, the width of the transition zone 113 can be between about 0.1 mm and about 5 mm, between about 0.2 mm and about 4 mm, between about 0.2 mm and about 6 mm, between about 0.5 mm and about 5 mm, or between about 0.5 mm and about 4 mm for different threshold values of residual cylinder power. For example, referring to FIG. 6(b), the width of the transition zone 113 where the maximum residual cylinder power is below a threshold residual cylinder power of 0.75 Diopter is greater than the width of the transition zone 113 where the maximum residual cylinder power is below a threshold residual cylinder power of 0.5 Diopter. As another example, the width of the transition zone 113 where the maximum residual cylinder power is below a threshold residual cylinder power of 1.0 Diopter is less than the width of the transition zone 113 where the maximum residual cylinder power is below a threshold residual cylinder power of 1.25 Diopter.

The transition zone 113 for various embodiments of quasi progressive lens has a longer length as compared with the length of the blended zone 107 of blended bifocal lenses. Thus, the optical power gradient in the transition zone 113 of an embodiment of a quasi progressive lens is lower than the optical power gradient in the blended zone 107 of blended bifocal lens. Accordingly, a patient may have less discomfort when transitioning from a distance vision state to a near vision state when using quasi progressive lenses as compared to when using blended bifocal lenses.

Furthermore, as discussed above, the presence of the transition zone 113 allows a smooth and continuous transition between the first optical zone 101 and the second optical zone 103 as shown in FIG. 5(c). Moreover, as discussed above with reference to FIG. 5(c), the length and shape of the transition zone 113 in various embodiments of quasi progressive lenses is configured to provide a continuous and monotonic increase in optical power from the first optical zone 101 to the second optical zone 103 without any physical surface discontinues (e.g., in z direction) or fast prism change. Accordingly, the embodiments of quasi progressive lenses can have reduced visual distortion along the convergence path (for example, one order of magnitude lower) as compared to blended and flat-top bifocal lenses. Furthermore, the power change across the blended zone 107 of a blended bifocal lens can be fast and volatile as compared to the power change across the transition zone 113 of a quasi progressive lens which can result in increased distortion in a blended bifocal lens along the convergence path as compared to a quasi progressive lens. As used herein, visual distortions refer to the amount of residual cylinder power or aberrations. Reduced distortions include residual cylinder power or aberrations below an aberration threshold, such as, for example, about 1.0 Diopter, 0.75 Diopter, 0.5 Diopter, 0.25 Diopter, or 0.125 Diopter. For example, the residual cylinder power or aberrations along the convergence path between the first optical zone 101 and the second optical zone 103 can be greater than 5 Diopters for blended bifocal lenses having an addition power of about 2 Diopters and in theory infinite for flat-top bifocal lenses. In contrast, the residual cylinder power or aberrations along the convergence path between the first optical zone 101 and the second optical zone 103 for various embodiments of quasi progressive lenses described herein can be less than about 5 Diopters. For example, in various implementations of quasi progressive lenses described herein, the residual cylinder power or aberrations along the convergence path from the first optical zone 101 to the second optical zone 103 can be less than or equal to about 1 Diopter, less than or equal to about 0.75 Diopter, less than or equal to about 0.5 Diopter, less than or equal to about 0.25 Diopter, less than or equal to about 0.125 Diopter, etc.

Figure 7:
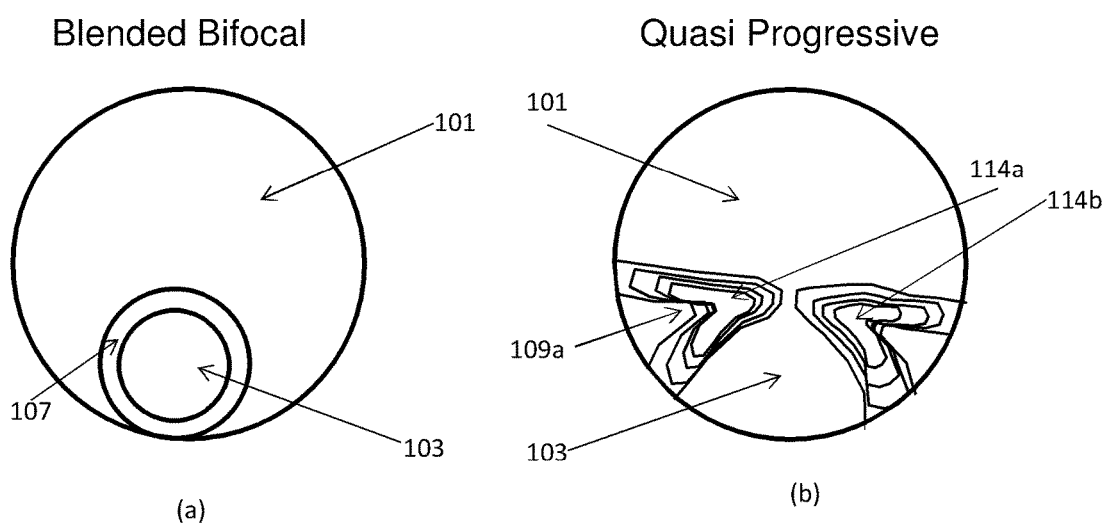
FIGS. 7(a) and 7(b) illustrate maps of the residual cylinder power or aberrations in various optical zones for an embodiment of a blended bifocal lens and a quasi progressive lens, respectively.
Figure 8A:
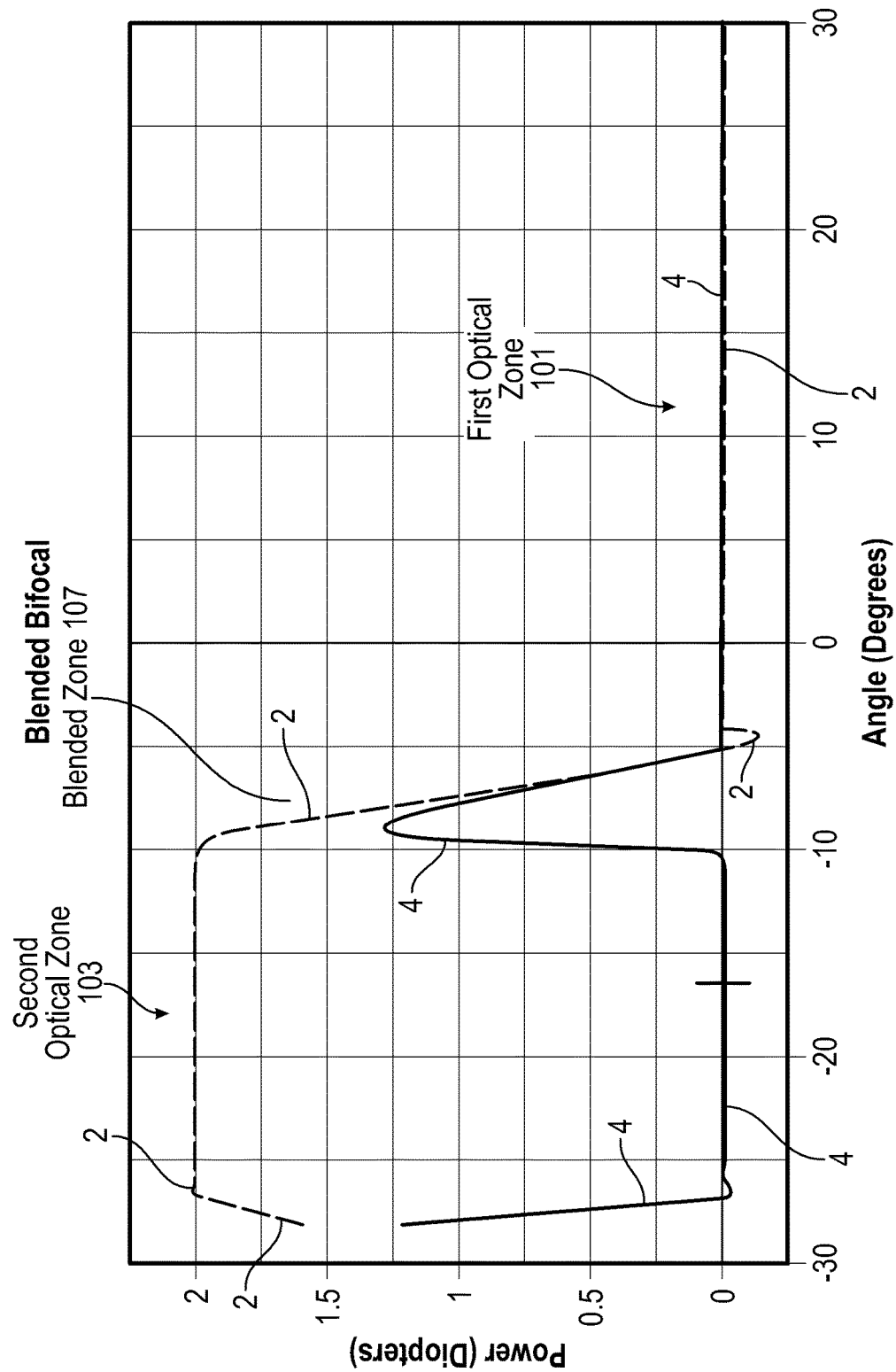
FIGS. 8(a) and 8(b) illustrate the variation of the optical addition power and the residual cylinder power as a function of view angle in various optical zones for an embodiment of a blended bifocal lens and an embodiment of a quasi progressive lens respectively.
Figure 8B:
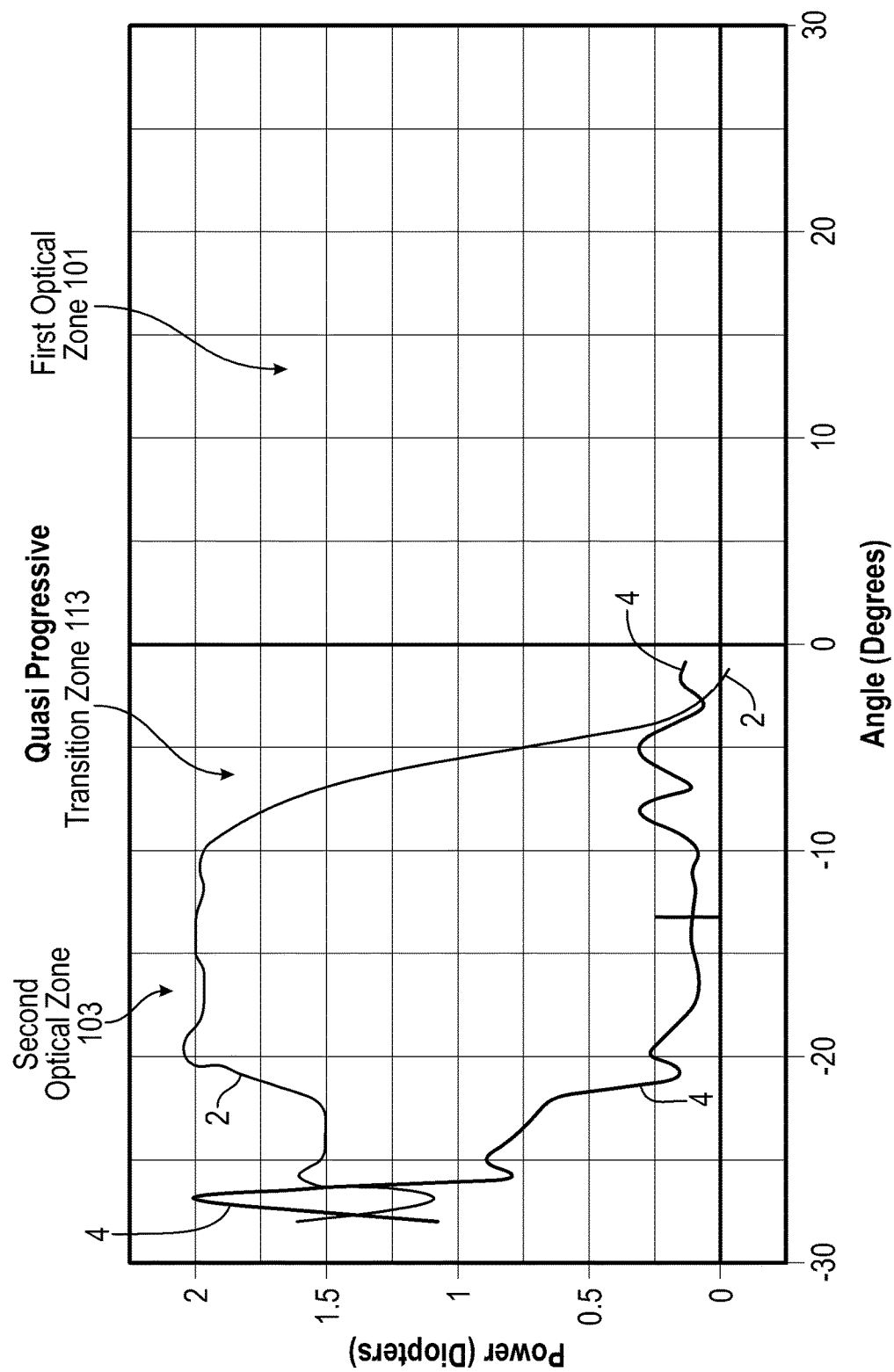

FIGS. 7(a)-(b) and 8(a)-(b) illustrate the differences between an embodiment of a blended bifocal lens and an embodiment of a quasi progressive lens. FIG. 7(b) illustrates a map of the residual cylinder power for an embodiment of a quasi progressive lens. Embodiments of the blended bifocal lens can have high values for maximum residual cylinder power in the blended zone 107 along the convergence path. For example, in some embodiments, the maximum residual cylinder power can be about 10.64 Diopter in the blended zone 107 along the convergence path between the first and the second optical zones 101 and 103. In contrast, as discussed above, for embodiments of quasi progressive lenses, the residual cylinder power in the transition zone 113 which is along the convergence path is reduced. In fact, as noted from FIG. 7(b), the maximum value of the residual cylinder power occurs in the peripheral zone for the embodiment of the quasi progressive lens which lies outside the convergence path. Accordingly, the embodiment of the quasi progressive lens has a reduced visual distortion as compared to the embodiment of the blended bifocal lens and the residual distortion is distributed off to the periphery. The variation of residual cylinder power along the convergence path for an embodiment of a blended bifocal lens and an embodiment of a quasi progressive lens is illustrated in FIGS. 8(a) and 8(b).

FIGS. 8(a) and 8(b) illustrate the variation of the optical addition power and the residual cylinder power as a function of view angle in various optical zones for an embodiment of a blended bifocal lens and an embodiment of a quasi progressive lens respectively. Referring to FIGS. 8(a) and 8(b), the curve 2 shows the variation of optical addition power as a function of view angle in various optical zones, while the curve 4 shows the variation of residual cylinder power as a function of view angle in various optical zones. The view angle corresponds to the vertical angle of gaze along the convergence path relative to the fitting point. A view angle of zero corresponds to a patient gazing straight ahead at the horizon through the fitting point. The view angle can also be considered as the angle that the line of sight makes with the fitting point when the patient is viewing objects at various distances. The view angle can be correlated to the vertical distance from the fitting point the convergence path on the surface of the lens.

It is noted from FIG. 8(a) that for the embodiment of the blended bifocal lens, the residual cylinder power in the blended zone 107 is greater than 1.0 Diopter. In contrast, it is noted from FIG. 8(b) that for the embodiment of the quasi progressive lens, the residual cylinder power in the transition zone 113 is less than 0.5 Diopter. Accordingly, the quasi progressive lens can have greater visual acuity along the convergence path than the blended bifocal lens.

Various embodiments of quasi progressive lenses described herein can also provide several benefits over progressive lenses. For example, a quasi progressive lens can provide larger and cleaner first and second optical zones 101 and 103 as compared to a progressive lens. For example, in various embodiments of a quasi progressive lens providing an optical addition power greater than or equal to 1.75 Diopter, the size of the first optical zone 101 (or far vision zone) as characterized by the horizontal width through the fitting point where the maximum residual cylinder power or aberrations is below a threshold (e.g., 0.5 Diopter) can be between about 30 mm and about 70 mm. In various embodiments, for certain addition powers, the size of the first optical zone 101 can be approximately equal to full width of the lens. In contrast, in various embodiments of a progressive lens providing the same optical addition power greater than or equal to 1.75 Diopter, the size of the first optical zone 101 as characterized by the horizontal width through the fitting point where the maximum residual cylinder power or aberrations is below a threshold (e.g., 0.5 Diopter) is less than 20 mm. More particularly, as shown in Table 2 below, in various implementations of quasi progressive lenses, the width of the second optical zone 103 having certain addition power for providing near vision and maximum residual cylinder power or aberrations below a threshold (e.g., 0.5 Diopter) can be about 1.5 times to about 5 times larger than the second optical zone 103 (or near vision zone) having the same addition power and maximum residual cylinder power or aberrations below a threshold (e.g., 0.5 Diopter) in various implementations of progressive lenses. The increase in the width of the second optical zone 103 can advantageously provide a patient with a larger area through which to view objects at near distance using various implementations of quasi progressive lenses with a certain addition power as compared various implementations of progressive lenses with the same addition power.

The increase in the width of the second optical zone 103 having a certain addition power for various embodiments of quasi progressive lenses with respect to a width of the second optical zone 103 having a comparable addition power for various embodiments of progressive lenses can be attributed to the decreased width of the transition zone 113 of the quasi progressive lens as compared to the width of the corridor 111 of a progressive lens. In comparison to the corridor 111 of an embodiment of a progressive lens, the transition zone of an embodiment of a quasi progressive lens can be significantly shorter and narrower. For example, the length of the transition zone 113 for various embodiments of quasi progressive lenses can be between about 3 mm and about 10 mm (e.g., between about 5 mm and about 8 mm, between about 6 mm and about 8 mm, between about 4 mm and about 8 mm, about 4 mm, about 5 mm, about 6 mm, about 7 mm and about 8 mm).

The reduced length of the transition zone 113 also enables less movement of the gaze from the first optical zone 101 to reach the second optical zone 103 in comparison to embodiments of progressive lenses. This reduction in travel can decrease the time required by a patient's eye to transition from a distant viewing state to a near viewing state and allow viewing near objects at more ergonomic angles of gaze.

One disadvantage for the quasi progressive lens, however, results from the short length of the transition zone 113. To produce the change in power from the first zone 101 to the second optical zone 103 over the short length entails a higher power gradient than for a conventional progressive lens. Table 1 below provides the minimum vertical power gradient along the convergence path for various values of optical addition power for an embodiment of a quasi progressive lens. As a consequence, in contrast to embodiments of progressive lenses, objects at intermediate distances cannot be viewed comfortably through the transition zone 113 due to the reduced spatial dimensions of the transition zone 113 and high optical power gradients in the transition zone 113. As noted from Table 1 below, the minimum vertical power gradient along the convergence path increases as the optical addition power increases. For example for an optical addition power of 0.75 Diopter, the minimum vertical power gradient is about 0.08 Diopter/mm. As another example for an optical addition power of 4.0 Diopter, the minimum vertical power gradient is about 0.44 Diopter/mm. The optical addition power and the minimum vertical gradient can include values between the values set forth in Table 1 below. Accordingly, various embodiments may include ranges established by any of these values.

TABLE 1

Minimum vertical power gradient along the convergence path in Diopter/mm for various values of optical addition power.

| Optical Addition power [Diopter] | Minimum vertical gradient along the convergence path [Diopter/mm] |
| --- | --- |
| 0.75 | 0.08 |
| 1 | 0.11 |
| 1.25 | 0.14 |
| 1.5 | 0.17 |
| 1.75 | 0.19 |
| 2 | 0.22 |
| 2.25 | 0.25 |
| 2.5 | 0.28 |
| 2.75 | 0.31 |
| 3 | 0.33 |
| 3.25 | 0.36 |
| 3.5 | 0.39 |
| 3.75 | 0.42 |
| 4 | 0.44 |

Table 2 below presents a comparison of various parameters of three different embodiments of quasi progressive lenses with an embodiment of a progressive lens. The embodiment of a progressive lens is an extremely short progressive lens with a corridor length of 11 mm (e.g., Shamir Autograph II™ 11). The first embodiment of the quasi progressive lens has a near vision zone size of about 20 mm and a transition zone length of about 10 mm. The second embodiment of the quasi progressive lens has near vision zone size of about 20 mm and a transition zone with a length of about 7 mm. The third embodiment of the quasi progressive lens has a near vision zone size of about 15 mm and a transition zone with a length of about 5 mm. For the sake of comparison, the embodiments of the progressive lens and the quasi progressive lenses have a far vision power prescription of zero. Accordingly, the embodiments of the progressive lens and the quasi progressive lenses can be considered as planar lens at the first optical zone (or far vision zone). The embodiments of the progressive lens and the quasi progressive lens, are considered to have a base power of about 4.0 Diopter and addition powers of about 1.0 Diopter, about 2.0 Diopter, and about 3.0 Diopter.

The corridor length of the progressive lens and the length of the transition zone of the embodiments of the quasi progressive lens are measured along the convergence path starting from the lowest point below the fitting point where the addition power has a value of 0.1 Diopter to a point along the convergence path in the near vision zone having an addition power equal to the maximum addition power minus 0.1 Diopter. The corridor width of the progressive lens and the width of the transition zone of the embodiments of the quasi progressive lens are measured for two different aberration thresholds. In Table 2 below the values of the width for the corridor and the transition zone provided within parenthesis are measured within an aberration threshold of about 0.5 Diopter. In Table 2 below the values of the width for the corridor and the transition zone that are provided without parenthesis are measured within an aberration threshold of about 1.0 Diopter. The far vision zone sized is characterized by the horizontal width of the far vision zone passing through the fitting point (FP) where the residual cylinder power is less than 0.5 Diopter. The near vision zone size is characterized by the horizontal width of a line passing through the near reference point (NRP) where the addition power is not less than the maximum addition power (e.g., 1.0 Diopter, 2.0 Diopter or 3.0 Diopter) minus 0.25 Diopter. Alternatively, in various embodiments, the near vision zone size can be characterized by the width through the centroid of an area of the second optical zone 103 (or near vision zone) where the addition power is not less than the maximum addition power (e.g., 1.0 Diopter, 2.0 Diopter or 3.0 Diopter) minus 0.25 Diopter. The maximum residual cylinder corresponds to the maximum cylindrical aberrations in the peripheral zones 109. The various parameters set forth below such as corridor/transition zone width, far vision zone size, near vision zone size, addition power and maximum residual cylinder power can include values between the values set forth in Table 2 below. Accordingly, various embodiments may include ranges established by any of these values.

TABLE 2

Comparison of various parameters of three different embodiments of quasi progressive lenses with an embodiment of a progressive lens.

| Design: | | Progressive, extreme short Autograph II ™ | Quasi Progressive, 20 mm segment | Quasi Progressive, 20 mm segment | Quasi Progressive, 15 mm segment |
| --- | --- | --- | --- | --- | --- |
| Corridor/Transition zone Length [mm] | | 11 | 10 | 7 | 5 |
| Addition 1 [Diopter] | Corridor/ Transition zone Width [mm] | N.A (40.6) | 6.7 (2.9) | 4.4 (2.2) | 5.4 (2.5) |

TABLE 2-continued

Comparison of various parameters of three different embodiments of quasi progressive lenses with an embodiment of a progressive lens.

| | Design: | Progressive, extreme short Autograph II ™ | Quasi Progressive, 20 mm segment | Quasi Progressive, 20 mm segment | Quasi Progressive, 15 mm segment |
|---|---|---|---|---|---|
| | Far Vision Zone Size [mm] | 40.6 | 62.5 | 54.5 | 48.4 |
| | Near Vision Zone Size [mm] | 10 | 30 | 24 | 17 |
| | Maximum Residual Cylinder [D] | 0.90 | 2.84 | 2.99 | 2.37 |
| Addition 2 [Diopter] | Corridor/ Transition zone Width [mm] | 4.4 (2.0) | 3.3 (2.0) | 2.2 (1.0) | 2.4 (1.0) |
| | Far Vision Zone Size [mm] | 7.8 | 44.5 | 44.6 | 39.9 |
| | Near Vision zone Size [mm] | 8 | 28 | 22 | 15 |
| | Maximum Residual Cylinder [D] | 1.90 | 5.71 | 5.94 | 4.76 |
| Addition 3 [Diopter] | Corridor/ Transition zone Width [mm] | 2.6 (1.1) | 2.1 (1.2) | 1.7 (0.7) | 1.5 (0.0) |
| | Far Vision Zone Size [mm] | 5.0 | 55.6 | 38.4 | 33.8 |
| | Near Vision zone Size [mm] | 5 | 27 | 20 | 14 |
| | Maximum Residual Cylinder [Diopter] | 2.87 | 8.56 | 8.09 | 7.15 |

It is noted from Table 2, that for all values of addition powers (e.g., 1.0 Diopter, 2.0 Diopter or 3.0 Diopter) the width of the corridor for the embodiment of the progressive lens is significantly wider than the width of the transition zone for any of the three embodiments of quasi progressive lenses. It is further noted that the embodiment of the progressive lens has a much smaller near vision zone size than the three embodiments of quasi progressive lenses. Accordingly, the optical zone that provides near vision for the three embodiments of the quasi progressive lens is larger than the optical zone that provides near vision for the embodiment of the progressive lens.

The residual cylinder power in the peripheral regions of the lens depend on the length of the transition zone. Shortening the length of the transition zone can increase the residual cylinder power in the periphery. This effect is observed from Table 2, where the maximum residual cylinder has a reduced value for the embodiment of the progressive lens at all values of addition power as compared to the three embodiments of the quasi progressive lens. The width of the transition zone for a given length of the transition zone can also affect the maximum residual cylinder. For example, a wider transition zone can increase the maximum residual cylinder.

As discussed above, a short transition zone can lead to high power gradients in the transition zone which can cause visual distortions when the gaze shifts between distance vision and the near vision. Thus, by virtue of its length, the transition zone is optically non-functional for most patients in that it does not allow comfortably viewing objects through the transition zone. In various embodiments of quasi progressive lenses, objects at intermediate distances viewed through the transition zone may appear distorted, blurred, unclear, and/or unresolved. As discussed above with reference to FIGS. 6(a) and 6(b), the width of the transition zone is given by the distance between two points of the peripheral region that have residual cylinder power or aberrations less than an aberration threshold. In various embodiments, the aberration threshold can be less than or equal to about 0.125 Diopter, less than or equal to about 0.25 Diopter, less than or equal to about 0.5 Diopter, less than or equal to about 0.75 Diopter or less than or equal to about 1 Diopter. Reducing the width of the transition zone reduce the residual cylinder power or aberrations in the peripheral regions.

The first optical zone 101, the second optical zone 103, the transition zone 113 and the peripheral zones 109a and 109b can be processed on the surface of the lens using freeform technology. In implementing freeform technology, in various embodiments, a surface grid resolution is determined for designing and manufacturing the lens. The size of the surface grid elements can affect the accuracy of the features formed on the surface. For example, a finer grid obtained by decreasing the size of the grid elements can increase the accuracy of the features formed on the surface. In contrast, a coarser surface grid obtained by increasing the size of the grid elements may reduce the accuracy of the features formed on the surface. However, a coarser grid may shorten design and/or production time and may be more cost effective from a manufacturing standpoint. For example, a grid resolution of 1 mm can be sufficient for the spatial frequency required for the optical features of quasi progressive lenses. Since, the size of the features of quasi progressive lenses are generally of the same order as the size of the features of progressive lenses, the embodiments of quasi progressive lenses described herein can be manufactured on the freeform machinery in the manufacturing labs using the same manufacturing profiles and parameters used for producing progressive lenses. Manufacturing quasi progressive lenses using freeform technology can also provide significant reduction in manufacturing time and costs as compared to manufacturing blended bifocal lenses since blended bifocal designs have smaller/sharper optical features in the blending zone as compared to the optical features of quasi progressive lenses.

Example Embodiments of a Quasi Progressive Lens

As discussed above, various embodiments of a quasi progressive lens can include a first optical zone disposed in the upper portion of a surface (e.g., forward or rearward) of the lens, a second optical zone disposed in the lower portion of the same surface and a short and narrow transition zone connecting the first and second optical zone. The body of the lens can comprise a variety of optical materials including but not limited to CR-39, Trivex, 1.56, SuperLite 1.60, SuperLite 1.67, Polycarbonate, and SuperLite 1.74. Other optical materials can also be used. The body of the lens can be subject to a variety of pre-treatments including but not limited to Clear™, Transitions™ VI and VII (Gray, Brown), Transitions XtrActive™, Transitions Vantage™, Polarized (Gray, Brown) and Drivewear™ The lens body can comprise tints or coating (e.g., hard anti-scratch coating, anti-reflection coating, etc.).

The first optical zone is configured to provide far or distance vision, such as, for example, at distances beyond about 20 feet. In various embodiments, the first optical zone can be configured to provide intermediate distance vision, such as, for example, at distances between about 2 feet and about 20 feet. The first optical zone can have a spherical power range between about −20 Diopter and about 20 Diopter to correct for refractive errors in a patient's eye. In addition, the first optical zone can have a cylinder power in the range between about −10 Diopter to about 0 Diopter or 0 Diopter to about +10 Diopter to correct for astigmatic errors in the patient's eye. The first optical zone can also include an area having a residual cylinder power or aberrations less than or equal to about 0.25 Diopter, less than or equal to about 0.12 Diopter, less than or equal to about 0.06 Diopter and/or less than or equal to about 0.03 Diopter. The width of the first optical zone can vary between about 20 mm to about 70 mm depending on the surface area of the lens body, the width and height of the frame selected by the patient and the patient's facial structure and other physical characteristics. In various embodiments, the width of the first optical zone can be greater than or equal to 50 mm, greater than or equal to 40 mm or greater than or equal to 30 mm. In various embodiments, the width of the first optical zone can include the full width of the lens. The height of the first optical zone can vary from about 6 degrees below the fitting point to about 30 degrees above the fitting point. For example, in various embodiments, the height of the first optical zone can be between about 3 degrees above the fitting point and about 20 degrees above the fitting point. As another example, in various embodiments, the height of the first optical zone can be between about 2 degrees below the fitting point and about 25 degrees above the fitting point. In various embodiments, the bottom (or lower portion) of the first optical zone can extend below the fitting point. For example, the bottom (or lower portion) of the first optical zone can extend up to about 6 mm below the fitting point. In various embodiments, the bottom (or lower portion) of the first optical zone can extend between about 2 mm to about 3 mm below the fitting point.

The second optical zone is configured to provide near vision, such as, for example, at distances of about 16 inches. In various embodiments, the second optical zone can be configured to provide intermediate distance vision, such as, for example, at distances between about 2 feet and about 20 feet. In various embodiments, the second optical zone can be disposed nasally on the surface of the lens. The second optical zone can have a variety of shapes such as, for example, circular, elliptical, D shape (with or without rounded edges), etc. The second optical zone can have an additional spherical power in the range between greater than 0 or 0.25 Diopter to about 4 Diopter relative to the spherical power provided by the first optical zone. The second optical zone can also include an area having a residual cylinder power or aberrations less than or equal to about 0.25 Diopter, less than or equal to about 0.12 Diopter, less than or equal to about 0.06 Diopter and/or less than or equal to about 0.03 Diopter. The width of the second optical zone can vary between about 6 mm to about 40 mm. In various embodiments, the width of the second optical zone can be greater than, equal to or less than 12 mm, greater than, equal to or less than 15 mm, greater than, equal to or less than 20 mm or greater than, equal to or less than 24 mm. In various embodiments, a nominal addition power of about 0.01 Diopter, 0.03 Diopter, 0.06 Diopter, 0.1 Diopter or 0.25 Diopter is reached at a distance between about 4 mm and about 20 mm below the fitting point. For example, a nominal addition power can be reach at a distance of about 10 mm below the fitting point in some embodiments. In various embodiments of quasi progressive lenses a portion of the region having the maximum addition power can be along the convergence path.

The transition zone connecting the first and second optical zones can have a length between about 3 mm to about 10 mm. For example, a length of the transition zone can be between about 5 mm and about 8 mm. The width of the transition zone with a threshold residual cylinder power less than 1.0 Diopter can be less than or equal to about 4 mm. The width of the transition zone with a threshold residual cylinder power less than 0.75 Diopter can be less than or equal to about 3 mm. The width of the transition zone with a threshold residual cylinder power less than 0.5 Diopter can be less than or equal to about 2 mm. The width of the transition zone with a threshold residual cylinder power less than 0.25 Diopter can be less than or equal to about 1 mm. The transition zone can include an area having a residual cylinder power or aberrations less than or equal to about 1.0 Diopter, less than or equal to about 0.75 Diopter, less than or equal to about 0.5 Diopter, less than or equal to about 0.25 Diopter and/or less than or equal to about 0.12 Diopter.

Although a variety of examples are provided herein a wide range of variations are possible. For example, the width of near vision zone providing different addition powers greater than 0.5 Diopter (e.g., any one of the ranges between 0.75 Diopter to about 1.5 Diopter, between 1.75

Diopter to about 2.5 Diopter or between 2.75 Diopter to about 4.0 Diopter) can be about 10 mm, 12 mm, 15 mm, 20 mm, 25 mm, 30 mm, 35 mm, 40 mm, etc. as well as values in between any combination of these widths. As another example, the width of the far vision zone providing different addition powers greater than 0.5 Diopter (e.g., any one of the ranges between 0.75 Diopter to about 1.5 Diopter, between 1.75 Diopter to about 2.5 Diopter or between 2.75 Diopter to about 4.0 Diopter) can be 20 mm, 25 mm, 30 mm, 35 mm, 40 mm, 45 mm, 50 mm, 55 mm, 60 mm, 65 mm, 70 mm etc. as well as values in between any combination of these widths.

As yet another example, the length of the transition zone for a lens providing an addition power greater than about 0.5 Diopter (e.g., any one of the ranges between 0.75 Diopter to about 1.5 Diopter, between 1.75 Diopter to about 2.5 Diopter or between 2.75 Diopter to about 4.0 Diopter) can be about 3 mm, 4 mm, 5 mm, 6 mm, 7 mm, 8 mm, etc. as well as values in between any combination of these lengths.

As another example, the width of the transition zone with a threshold residual cylinder power less than any of 0.5 Diopter, 1.0 Diopter or 1.25 Diopter for a lens providing an addition power of 0.5 Diopter (e.g., any one of the ranges between 0.75 Diopter to about 1.5 Diopter, between 1.75 Diopter to about 2.5 Diopter or between 2.75 Diopter to about 4.0 Diopter) can be about 0.5 mm, 1 mm, 2 mm, 3 mm, 4 mm as well as values in between any combination of these widths.

As another example, the maximum residual cylinder power in the peripheral zone can be about 1.5 Diopter, 2.0 Diopter, 2.5 Diopter, 3.0 Diopter, 4.0 Diopter, 5.0 Diopter, 6.0 Diopter, 7.0 Diopter, 8.0 Diopter, 9.0 Diopter, 10.0 Diopter, 11.0 Diopter, 12.0 Diopter, etc. as well as values in between any combination of maximum residual cylinder powers. In various embodiments, the residual cylinder power in the peripheral zone can be greater than 1.5 Diopter, 2.0 Diopter, 2.5 Diopter, 3.0 Diopter, 4.0 Diopter, 5.0 Diopter, 6.0 Diopter, 7.0 Diopter, 8.0 Diopter, 9.0 Diopter, 10.0 Diopter or 11.0 Diopter.

The above presents a description of systems and methods contemplated for carrying out the concepts disclosed herein, and of the manner and process of making and using it, in such full, clear, concise, and exact terms as to enable any person skilled in the art to which it pertains to make and use this invention. The systems and methods disclosed herein, however, are susceptible to modifications and alternate constructions from that discussed above which are within the scope of the present disclosure. Consequently, it is not the intention to limit this disclosure to the particular embodiments disclosed. On the contrary, the intention is to cover modifications and alternate constructions coming within the spirit and scope of the disclosure as generally expressed by the following claims, which particularly point out and distinctly claim the subject matter of embodiments disclosed herein.

Although embodiments have been described and pictured in an exemplary form with a certain degree of particularity, it should be understood that the present disclosure has been made by way of example, and that numerous changes in the details of construction and combination and arrangement of parts and steps may be made without departing from the spirit and scope of the disclosure as set forth in the claims hereinafter.

What is claimed is:

1. An ophthalmic lens comprising:
   a far optical zone capable of providing far vision;
   a near optical zone capable of providing near vision; and
   a corridor connecting the far optical zone and the near optical zone,
   the corridor having a length between 6 and 8 mm,
   wherein the near optical zone has a width between 15 mm and 24 mm and has residual cylinder power less than 0.25 Diopter.

2. The ophthalmic lens of claim 1, wherein the far optical zone has a width between 20 mm and 70 mm.

3. The ophthalmic lens of claim 1, wherein the near optical zone provides an addition between 0.75 and 4.0 D.

4. The ophthalmic lens of claim 3, wherein said near and far optical zones and said corridor are provided for on a back surface of said lens.

5. The ophthalmic lens of claim 4, wherein said back surface comprises a freeform surface.

6. The ophthalmic lens of claim 5, wherein the corridor has a length such that objects cannot be viewed comfortably through the corridor.

7. The ophthalmic lens of claim 6, wherein said near optical zone includes prism power for providing prism correction.

8. The ophthalmic lens of claim 1, wherein the corridor has a length such that objects cannot be viewed comfortably through the corridor.

9. The ophthalmic lens of claim 8, wherein the near optical zone provides an addition between 0.75 and 4.0 D.

10. The ophthalmic lens of claim 9, wherein said near and far optical zones and said corridor are provided for on a back surface of said lens.

11. The ophthalmic lens of claim 8, wherein the far optical zone has a width between 20 mm and 70 mm.

12. The ophthalmic lens of claim 1, wherein said near optical zone includes prism power for providing prism correction.

13. The ophthalmic lens of claim 1, wherein the near and far optical zones and said corridor are provided for on a back surface of said lens.

14. The ophthalmic lens of claim 1, wherein the near and far optical zones and said corridor are provided for on a front surface of said lens.

15. The ophthalmic lens of claim 1, comprising a freeform lens having back or front surfaces comprising a freeform surface.

16. The ophthalmic lens of claim 1, wherein the far optical zone has a width between 20 mm and 70 mm and the near optical zone provides an addition between 0.75 and 4.0 D.

17. The ophthalmic lens of claim 16, wherein said near and far optical zones and said corridor are provided for on a back surface of said lens.

18. The ophthalmic lens of claim 17, wherein said back surface comprises a freeform surface.

19. The ophthalmic lens of claim 18, wherein the corridor has a length such that objects cannot be viewed comfortably through the corridor.

20. The ophthalmic lens of claim 19, wherein said near optical zone includes prism power for providing prism correction.

* * * * *